May 30, 1933.  V. R. ANDERSON  1,912,167
ELECTRICAL RECIPROCATING MOTOR
Filed July 13, 1931   2 Sheets-Sheet 1
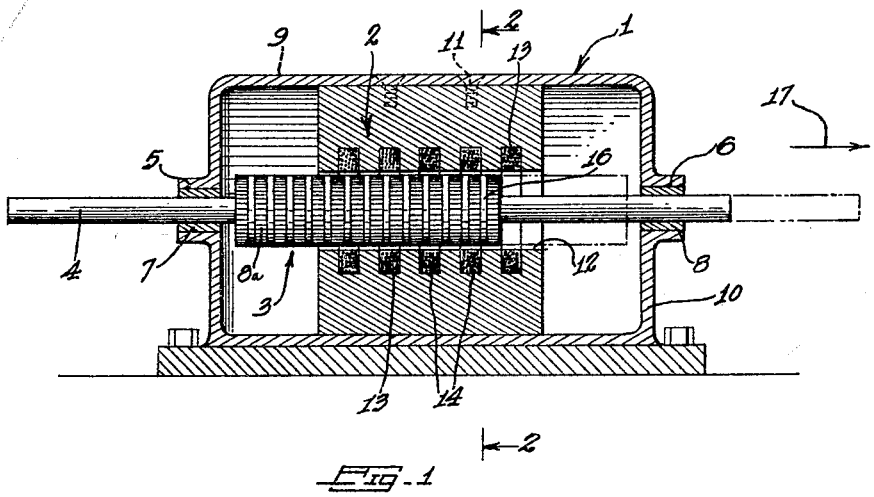
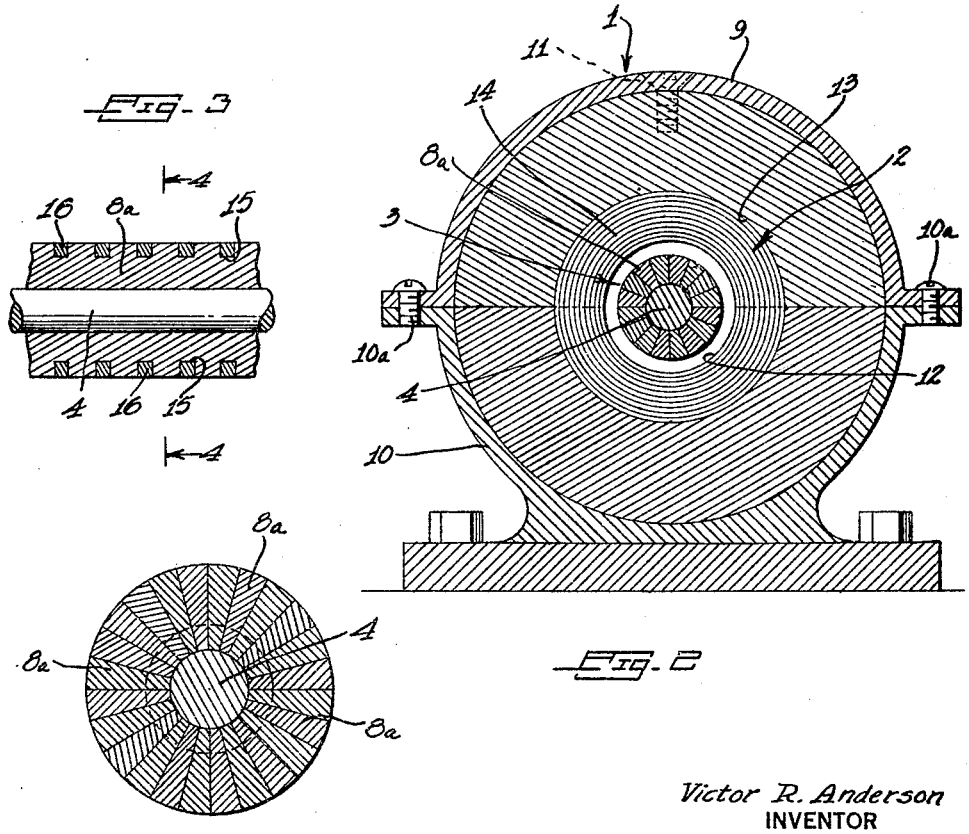
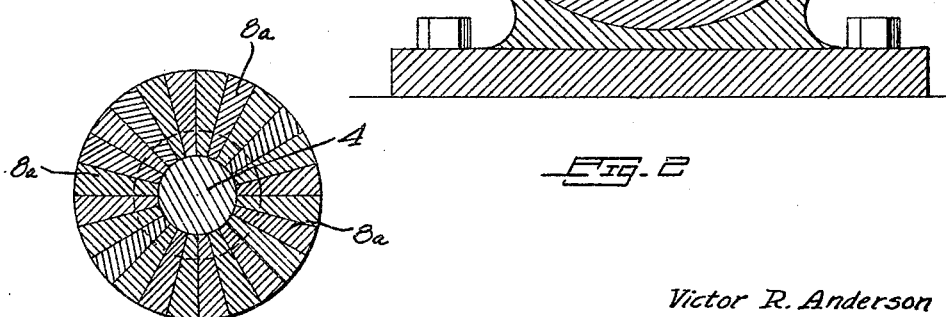
Victor R. Anderson
INVENTOR
BY Munn & Co.
ATTORNEYS May 30, 1933.    V. R. ANDERSON    1,912,167
ELECTRICAL RECIPROCATING MOTOR
Filed July 13, 1931    2 Sheets-Sheet 2
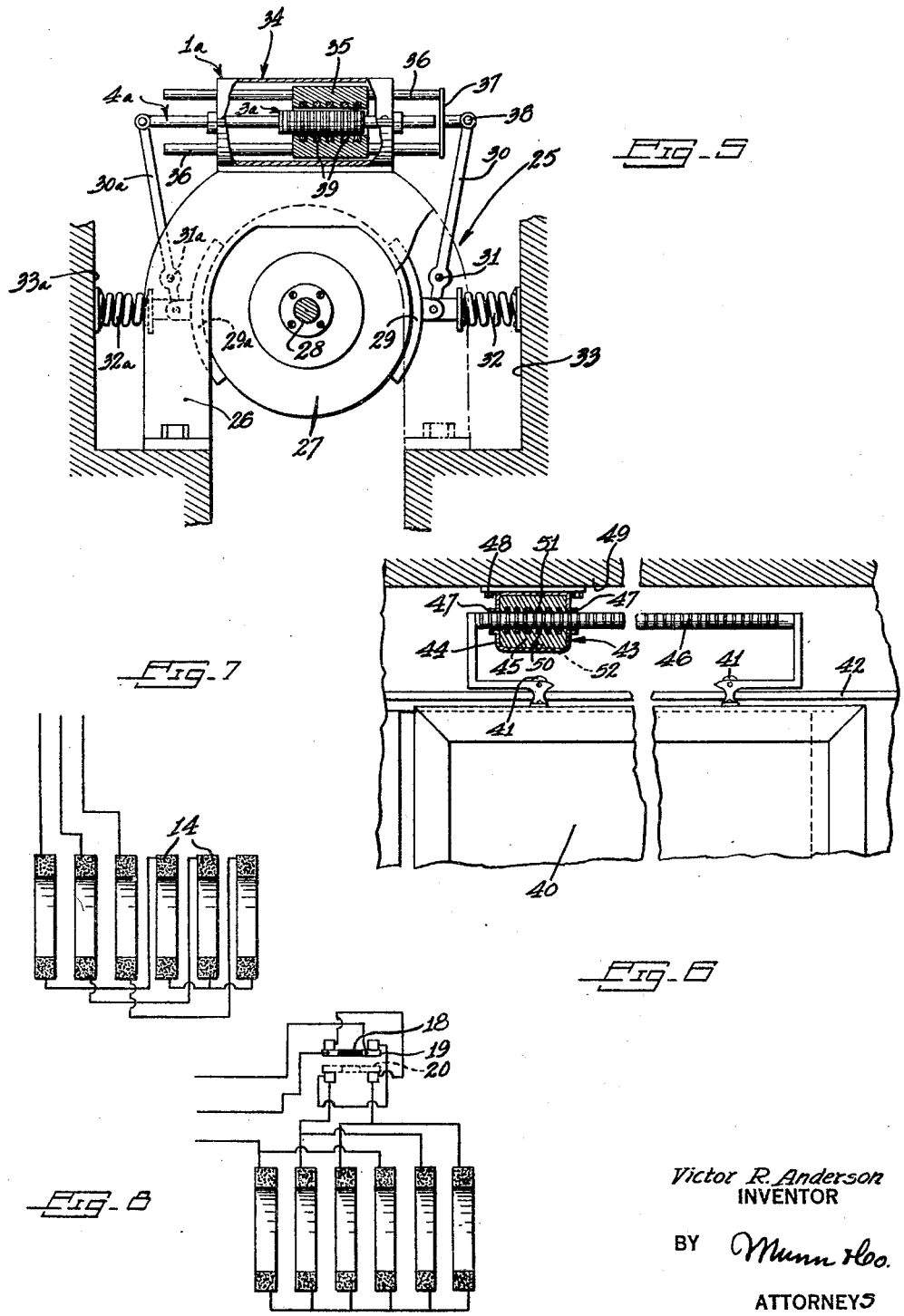
Victor R. Anderson
INVENTOR Patented May 30, 1933

1,912,167

UNITED STATES PATENT OFFICE

VICTOR RUSSELL ANDERSON, OF CHICAGO, ILLINOIS, ASSIGNOR OF ONE-HALF TO LEROY J. LEAHY, OF CHICAGO, ILLINOIS

ELECTRICAL RECIPROCATING MOTOR

Application filed July 13, 1931. Serial No. 550,585.

My invention relates to improvements in electrical reciprocating motors, and it consists in the combinations, constructions, and arrangements herein described and claimed.

An object of my invention is to provide an electrical reciprocating motor having a traveling magnetic field.

A further object is to provide a motor of the character described adapted to be operated by alternating current.

A further object is to provide a motor adapted to be operated by a three phase alternating current.

A further object is to provide an electric motor having an armature structure adapted to serve as a reciprocatory member.

A further object is to provide a motor of the character described having field coils encircling its armature in such a manner that when the field coils are energized by alternating current the armature and the field coils will tend to move in opposite directions.

A further object is to provide a motor particularly adapted to utilize a reversible traveling magnetic field in such a manner that the motor and the field will tend to move in a straight line in opposite directions.

Other objects and advantages will appear in the following specification, and the novel features of the invention will be particularly pointed out in the appended claims.

My invention is illustrated in the accompanying drawings, forming part of this application, in which Figure 1 is a vertical sectional view of my invention, Figure 2 is an enlarged section taken along the line 2—2 of Figure 1, Figure 3 is a fragmentary sectional detail view of the armature, Figure 4 is a cross sectional view taken along the line 4—4 of Figure 3, Figure 5 is a side elevational view, partly in section, of a modification of my invention shown connected to a brake, Figure 6 is another modified form of my invention shown connected to a sliding door, Figure 7 is a wiring diagram showing one method of connecting the field coils to an electrical circuit, and Figure 8 is an electrical diagram showing a reversible switch associated with the electrical circuit connected to the field coils.

In carrying out my invention, I make use of a frame 1, a field structure 2, and an armature 3. The armature 3 may be fixedly connected to a shaft 4.

The frame 1 may be provided at either end with opposite aligned openings 5 and 6 having bearings 7 and 8, respectively, which are adapted to slidably support the shaft 4. The field structure 2 and the armature 3 may each be made of a solid piece of ferro-magnetic material or they may be laminated in any suitable manner. I have, for the purpose of illustration, shown the armature consisting of laminated sections 8a which may extend from one end of the armature to the other end substantially as shown.

The armature 3 may be either round or angular in cross section as the armature is designed to move forward and backward in a reciprocatory manner. The frame 1 may consist of an upper section 9 and a lower section 10. These sections may be secured together in any suitable manner such as, for instance, by screws 10a. The field structure may be rigidly secured to the casing 1 by screws 11. The field structure may be provided with a centrally disposed opening 12 for the purpose of receiving the armature 3. Adjacent to this central opening I have provided spaced-apart annular grooves 13 for receiving field coils 14. These field coils are disposed at right angles to the axis of the shaft 4 and encircle the armature 3 substantially as shown in Figure 1.

The armature is provided with circumferentially disposed annular grooves 15 in which are positioned conducting rings 16.

The field coils may be connected to a three phase alternating current circuit substantially as shown in Figures 7 and 8.

From the foregoing description of the various parts of the device, the operation thereof may be readily understood.

When the field coils 14 are connected as is indicated in Figure 7 and the field is energized, the armature will tend to move toward one end of the frame as is indicated by the arrow 17. When the field coils are connected as indicated in Figure 8, the armature will move back and forth as the switch member 18 is being alternately moved from the full line position 19 to the dotted line position 20.

In Figure 5 I have shown a slightly modified form of my invention applied to a brake construction generally indicated by the numeral 25. This brake construction may consist of a supporting structure 26, a drum 27 which may be fixedly mounted on a shaft 28, and brake shoes 29 and 29a pivotally supported by lever arms 30 and 30a.

The lever arms 30 and 30a may be pivotally mounted on the structure 26 by pins 31 and 31a. The pins may be fixedly secured to the structure 26 in any suitable manner. The shoes 29 and 29a may be provided with compression springs 32 and 32a. These springs may be fixedly secured to the shoes 29 and 29a and to walls 33 and 33a in any manner whereby the shoes may be held normally in contact with the drum 27.

The brake construction 25 forms no novel part of my invention but is merely shown and described for the purpose of illustrating a use for the motor 34 which is shown mounted on the top of the structure 26. This motor is similar to the preferred form of my invention shown in Figure 1 except that it is provided with a floating field structure 35, mounted on rods 36, which in turn are slidably mounted in oppositely disposed openings (not shown) at either end of the casing 1a. One end of each of the rods 36 may be fixedly secured to a T-shaped member 37 which is pivotally connected as indicated at 38. It will be observed that the field structure 35 is not fixedly secured to the casing 1a and that it is adapted to move to and fro freely within the casing. The armature 3a and the shaft 4a may be mounted in the casing 1a in the same manner that the armature 3 and the shaft 4 are mounted in the frame 1. The shaft 4a may be pivotally connected to the lever arm 30a in substantially the same manner as the T-shaped member is connected to the lever arm 30. The field coils 39 may be similar to the field coils disclosed in the preferred form of my invention shown in Figure 1 and may be connected in the same manner. It is apparent that when the field coils 39 are energized the armature and the field structure will move in opposite directions and by so doing will loosen the brake shoes 29 and 29a on the drum 27 in such a manner as to allow the drum to move.

Another modified form of my invention is shown in Figure 6 connected to a sliding door 40. The door may be secured to rollers 41 supported on a track 42. The motor 43 comprises a frame 44, a field structure 45, and an elongated armature 46. The armature 46 may be slidably mounted in bearings 47. The frame 44 may be secured in any suitable manner such as, for instance, by screws 48 to a stationary supporting structure 49. The field structure 45 may be provided with grooves 50 and coils 51 in the same manner as is the field structure shown in Figure 1. The field structure may be rigidly secured to the casing 44 in any suitable manner such as, for instance, by screws 52. The armature 46 is similar in construction to the armature 3, except that it is of greater length. The field coils 51 may be connected as indicated in Figure 8.

From the foregoing description of the various parts of the motor 43 it is apparent that when the field coils 51 are energized the direction of movement of the armature 46 will depend upon the position of the switch member 18 and that the door 40 may be opened or closed by correctly operating the switch member 18.

I claim:

1. In a multi-phase reciprocating motor of the class described a stationary frame, a field structure within said frame provided with a central opening and having a field winding for each phase of the motor adjacent to and encircling said opening, a plunger armature slidably mounted within said frame, and movable within the central opening, each of said field windings comprising two or more coils connected in series with each other, at least one of the coils of each winding being disposed intermediate of the coils of another of said windings, said plunger armature being provided with a central shaft slidably mounted on the frame and projecting beyond each end of the frame, said armature having such length that it is longer than said field structure and always within at least one of the coils of each of said winding when it is at the end of its line of travel, said motor being provided with and operatively connected to a switch means whereby the length and the direction of the movement of the armature may be manually controlled.

2. In a multi-phase reciprocating motor of the class described a stationary frame, a field structure within said frame provided with a central opening and having a field winding for each phase of the motor adjacent to and encircling said opening, a plunger armature slidably mounted within said frame, and movable within the central opening, each of said field windings comprising two or more coils connected in series with each other, at least one of the coils of each winding being disposed intermediate of the coils of another of said windings, said plunger armature being provided with a central shaft slidably mounted on the frame and projecting beyond each end of the frame, said armature having such length that it is longer than said field structure and always within at least one of the coils of each of said windings when it is at the end of its line of travel, said field structure being slidably mounted within said frame and being provided with shaft means substantially longer than said frame.

3. In a multi-phase reciprocating motor of the class described a stationary frame, a field structure within said frame provided with a central opening and having a field winding for each phase of the motor adjacent to and encircling said opening, a plunger armature slidably mounted within said frame, and movable within the central opening, each of said field windings comprising two or more coils connected in series with each other, at least one of the coils of each winding being disposed intermediate of the coils of another of said windings, said plunger armature being provided with a central shaft slidably mounted on the frame and projecting beyond each end of the frame, said armature having such length that it is longer than said field structure and always within at least one of the coils of each of said windings when it is at the end of its line of travel, said motor being provided with and operatively connected to a switch means whereby the length and the direction of the movement of the armature may be manually controlled, said field structure being slidably mounted within said frame and being provided with shaft means substantially longer than said frame.

4. In a multi-phase reciprocating motor of the class described a stationary frame, a field structure within said frame provided with a central opening and having a field winding for each phase of the motor adjacent to and encircling said opening, a plunger armature slidably mounted within said frame, and movable within the central opening, each of said field windings comprising two or more coils connected in series with each other, at least one of the coils of each winding being disposed intermediate of the coils of another of said windings, said plunger armature being provided with a central shaft slidably mounted on the frame and projecting beyond each end of the frame, said armature having such length that it is longer than said field structure and always within at least one of the coils of each of said windings when it is at the end of its line of travel, said motor being provided with and operatively connected to a switch means whereby the length and the direction of the movement of the armature may be manually controlled, said armature being provided at either end with rigid supporting means, said supporting means being each provided with a bracket adapted to be secured to a slidable member.

5. In a multi-phase reciprocating motor of the class described a stationary frame, a field structure within said frame provided with a central opening and having a field winding for each phase of the motor adjacent to and encircling said opening, a plunger armature slidably mounted within said frame, and movable within the central opening, each of said field windings comprising two or more coils connected in series with each other, at least one of the coils of each winding being disposed intermediate of the coils of another of said windings, said plunger armature being provided with a central shaft slidably mounted on the frame and projecting beyond each end of the frame, said armature having such length that it is longer than said field structure and always within at least one of the coils of each of said windings when it is at the end of its line of travel, said motor being provided with and operatively connected to a switch means whereby the length and the direction of the movement of the armature may be manually controlled, said armature being provided at either end with rigid supporting means, said supporting means being each provided with a bracket adapted to be secured to a slidable member, and with a roller for movably supporting said armature and said sliding member upon a stationary track means.

6. In a multi-phase reciprocating motor of the class described a stationary frame, a field structure within said frame provided with a central opening and having a field winding for each phase of the motor adjacent to and encircling said opening, a plunger armature slidably mounted within said frame, and movable within the central opening, each of said field windings comprising two or more coils connected in series with each other, at least one of the coils of each winding being disposed intermediate of the coils of another of said windings, said plunger armature being provided with a central shaft slidably mounted on the frame and projecting beyond each end of the frame, said armature having such length that it is longer than said field structure and always within at least one of the coils of each of said windings when it is at the end of its line of travel, said field structure being slidably mounted within said frame and being provided with shaft means substantially longer than said frame, said central shaft of said armature being pivotally connected to a lever, said shaft means of said field structure being pivotally connected to a second lever, each of said levers being provided with a circular transverse open portion intermediate of their ends, and being provided at their ends not connected to said motor with a second transverse open portion, each of said open portions being pivotally connected to a brake shoe member each of said brake shoe members being adapted for clamping engagement with a rotatable member intermediate of said brake shoe members.

7. A reciprocating alternating current motor comprising a frame, a field structure within said frame provided with a central opening and having a field winding comprising a plurality of groups of coils adjacent to and encircling said opening, a plunger armature slidably mounted within said frame and movable within the central opening, each group of said field coils comprising two or more coils connected in series with each other, at least one of the coils of each group being disposed intermediate the coils of another of said groups, said plunger armature being provided with a central shaft slidably mounted in said frame and projecting beyond the same, said armature being of greater length than said field structure and always within at least one of the coils of each of said groups when it is at the end of its line of travel, and switch means for controlling the length and direction of movement of said armature.

VICTOR RUSSELL ANDERSON.